US010581678B1

(12) United States Patent
Chen et al.

(10) Patent No.: US 10,581,678 B1
(45) Date of Patent: Mar. 3, 2020

(54) WIRELESS SYSTEM FOR SETTING PARAMETERS

(71) Applicant: MEAN WELL (GUANGZHOU) ELECTRONICS CO., LTD., Guangzhou (CN)

(72) Inventors: Po-Ming Chen, Guangzhou (CN); Hsin-Hung Lu, Guangzhou (CN)

(73) Assignee: Mean Well (Guangzhou) Electronics Co., Ltd., Guangzhou (CN)

( * ) Notice: Subject to any disclaimer, the term of this patent is extended or adjusted under 35 U.S.C. 154(b) by 0 days.

(21) Appl. No.: 16/213,141

(22) Filed: Dec. 7, 2018

(30) Foreign Application Priority Data

Oct. 22, 2018 (TW) ............................... 107137167 A

(51) Int. Cl.
*H04W 4/80* (2018.01)
*H04L 12/24* (2006.01)

(52) U.S. Cl.
CPC ........... *H04L 41/0813* (2013.01); *H04W 4/80* (2018.02)

(58) Field of Classification Search
CPC .............................. H04L 41/0813; H04W 4/80
See application file for complete search history.

(56) References Cited

U.S. PATENT DOCUMENTS

| 7,006,820 | B1 * | 2/2006 | Parker | H04M 3/247 |
|---|---|---|---|---|
| | | | | 455/414.1 |
| 8,682,262 | B2 * | 3/2014 | Austin | H04N 7/163 |
| | | | | 455/556.1 |
| 2005/0253165 | A1 * | 11/2005 | Pace | H02M 7/538 |
| | | | | 257/139 |
| 2006/0253838 | A1 * | 11/2006 | Fujii | G06F 9/44505 |
| | | | | 717/124 |
| 2010/0186081 | A1 * | 7/2010 | Kawate | G06Q 20/105 |
| | | | | 726/17 |
| 2015/0097974 | A1 * | 4/2015 | Hamada | H04W 4/70 |
| | | | | 348/207.2 |
| 2015/0304478 | A1 * | 10/2015 | Kim | H04M 1/7253 |
| | | | | 455/414.3 |
| 2015/0378331 | A1 * | 12/2015 | Hayashi | H04L 41/0803 |
| | | | | 700/19 |
| 2018/0254640 | A1 * | 9/2018 | Jung | H02J 7/007 |
| 2019/0013702 | A1 * | 1/2019 | Muratov | H02J 50/80 |

* cited by examiner

*Primary Examiner* — Edward F Urban
*Assistant Examiner* — Ralph H Justus
(74) *Attorney, Agent, or Firm* — Rosenberg, Klein & Lee

(57) ABSTRACT

A wireless system for setting parameters includes at least one electronic device and a parameter-setting device. The electronic device has a first wireless transmission module, a processor, and a desirable device to be set. The processor is electrically connected to the first wireless transmission module and the desirable device. The parameter-setting device has a second wireless transmission module. The parameter-setting device is wirelessly connected to the processor and the desirable device through the first wireless transmission module and the second wireless transmission module. When the desirable device is shut down, the parameter-setting device transmits specification parameters to the first wireless transmission module through the second wireless transmission module to store the specification parameters into the first wireless transmission module. When the desirable device starts, the desirable device drives the processor to read the specification parameters and operates according to the specification parameters.

9 Claims, 4 Drawing Sheets

WIRELESS SYSTEM FOR SETTING PARAMETERS

This application claims priority for Taiwan patent application no. 107137167 filed on Oct. 22, 2018, the content of which is incorporated by reference in its entirety.

BACKGROUND OF THE INVENTION

Field of the Invention

The present invention relates to a system for setting parameters, particularly to a wireless system for setting parameters.

Description of the Related Art

Nowadays, companies produce various power supplies, but they cannot satisfy special requirement of consumers. Customized products are still realized with modifying hardware or firmware. Although updating firmware of products need not take great pains, using a simple planning tool to modify the specification of the products is indispensible. Thus, the product-planning tool such as soft development planning (SDP) is developed. However, this technology uses wired communication, such as a universal asynchronous receiver/transmitter (DART), a power management (PM) bus, or a controller area network (CAN) bus. Besides, the specification is not modified until the products start to operate.

Take a programmable charging voltage and a current charger as an example. The ENC charger is connected to a computer host through the planning tool to plan the charging parameters of the charger. In practice, a planning tool 10 is connected to a charger 12 through four cables including communication cables and power cables, as shown in FIG. 1. The planning tool 10 is connected to the computer host 14 through a universal serial bus (USB) cable to update charging parameters. Since there are many cables, the planning tool 10 is connected to a plurality of chargers 12 and the computer host 14 when many products require to be modified, as shown in FIG. 2. Each charger 12 is connected with four cables, and this modifying way becomes complicated. As a result, the cost of modifying products is greatly increased.

To overcome the abovementioned problems, the present invention provides a wireless system for setting parameters, so as to solve the afore-mentioned problems of the prior art.

SUMMARY OF THE INVENTION

The primary objective of the present invention is to provide a wireless system for setting parameters, which updates the specification parameters of a desirable device to be set of an electronic device in a wireless communication way to avoid connecting with the desirable device through a physical cable when the desirable device is shut down, thereby omitting the step of connecting the physical cable and greatly reducing the cost and time of modifying parameters. Since the desirable device need not start, the modifying process can be simplified to improve the competitiveness of the desirable device. Besides, the real-time state of the desirable device is obtained when the desirable device operates.

To achieve the abovementioned objectives, the present invention provides a wireless system for setting parameters, which comprises at least one electronic device and a parameter-setting device. The electronic device has a first wireless transmission module, a processor, and a desirable device to be set. The processor is electrically connected to the first wireless transmission module and the desirable device to be set. The parameter-setting device has a second wireless transmission module, the second wireless transmission module and the first wireless transmission module are wirelessly connected to the processor and the desirable device, the parameter-setting device establishes specification parameters and transmits the specification parameters to the first wireless transmission module through the second wireless transmission module to store the specification parameters into the first wireless transmission module when the desirable device is shut down, the desirable device drives the processor to read the specification parameters when the desirable device starts, the processor generates a setting signal according to the specification parameters and transmits the setting signal to the desirable device, and the desirable device operates according to the setting signal.

In an embodiment of the present invention, the parameter-setting device further comprises a smart device and a computer host. The smart device is electrically connected to the second wireless transmission module and has a built-in application program corresponding to the second wireless transmission module and the first wireless transmission module. The computer host is electrically connected to the smart device, the computer host establishes the specification parameters and transmits the specification parameters to the smart device to store the specification parameters into the smart device when the desirable device is shut down, and the smart device uses the application program to transmit the specification parameters to the first wireless transmission module through the second wireless transmission module to store the specification parameters into the first wireless transmission module.

In an embodiment of the present invention, the smart device is a smart phone.

In an embodiment of the present invention, the desirable device is a power supply, a charger, an inverter, or a variable frequency drive (VFD).

In an embodiment of the present invention, the power supply further comprises a transformer, an electronic control switch, a pulse width modulator, a comparison circuit, and an optical coupler. The transformer has a primary side and a secondary side, and the primary side receives a fixed voltage. The electronic control switch is electrically connected to the primary side and grounded. The pulse width modulator is electrically connected to the electronic control switch and the processor, controls a switching state of the electronic control switch, and uses the fixed voltage to store energy into the primary side, the secondary side converts the energy into an output signal, and the pulse width modulator drives the processor to read the specification parameters. The comparison circuit is electrically connected to the secondary side and the processor, receives the output signal and the setting signal, and compares the output signal with the setting signal to generate a comparison result. The optical coupler is electrically connected to the comparison circuit and the pulse width modulator, and the pulse width modulator receives the comparison result through the optical coupler and changes the output signal according to the comparison result.

In an embodiment of the present invention, the processor is electrically connected to the secondary side to receive the output signal and transmits the output signal to the parameter-setting device through the first wireless transmission module and the second wireless transmission module.

In an embodiment of the present invention, the specification parameters comprise an output current, an output voltage, and industrial information.

In an embodiment of the present invention, the first wireless transmission module and the second wireless transmission module are radio frequency identification (RFID) modules.

In an embodiment of the present invention, the first wireless transmission module is a near-field communication (NFC) reader and the second wireless transmission module is a near-field communication (NFC) tag.

In an embodiment of the present invention, the first wireless transmission module is an ultra high frequency (UHF) reader and the second wireless transmission module is an ultra high frequency (UHF) tag.

In an embodiment of the present invention, the at least one electronic device further comprises a plurality of electronic devices.

Below, the embodiments are described in detail in cooperation with the drawings to make easily understood the technical contents, characteristics and accomplishments of the present invention.

DETAILED DESCRIPTION OF THE INVENTION

Figure 1:
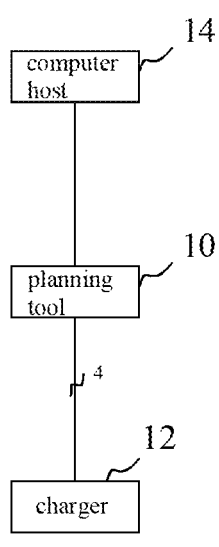
FIG. 1 is a diagram schematically showing a computer host, a planning tool, and a charger in the conventional technology.
Figure 2:
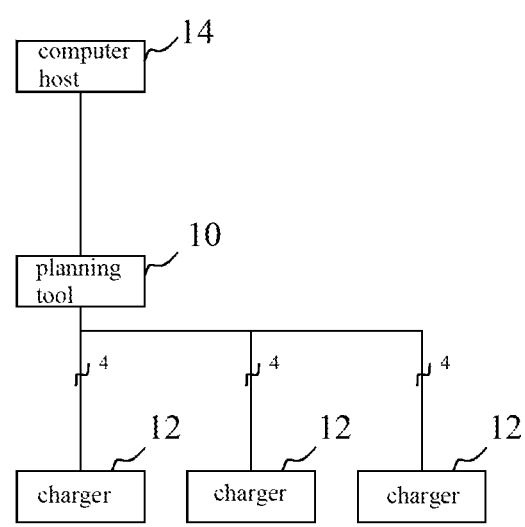
FIG. 2 is a diagram schematically showing a computer host, a planning tool, and a plurality of chargers in the conventional technology.
Figure 3:
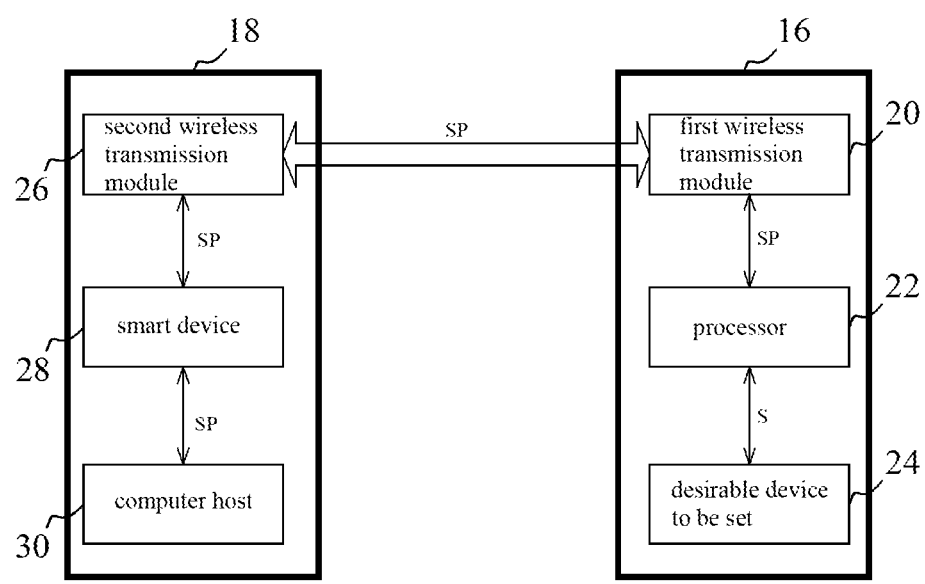
FIG. 3 is a diagram schematically showing a wireless device for setting parameters according to the first embodiment of the present invention.

Refer to FIG. 3. The first embodiment of the wireless system for setting parameters of the present invention is introduced as follows. The wireless system comprises at least one electronic device 16 and a parameter-setting device 18. In the first embodiment, the number of the electronic device 16 is one. The electronic device 16 has a first wireless transmission module 20, a processor 22, and a desirable device 24 to be set. The processor 22 is electrically connected to the first wireless transmission module 20 and the desirable device 24. The parameter-setting device 18 has a second wireless transmission module 26. The parameter-setting device 18 is wirelessly connected to the processor 22 and the desirable device 24 through the second wireless transmission module 26 and the first wireless transmission module 20. When the desirable device 24 is shut down, the parameter-setting device 18 establishes specification parameters SP and transmits the specification parameters SP to the first wireless transmission module 20 through the second wireless transmission module 26, so as to store the specification parameters SP into the first wireless transmission module 20. When the desirable device 24 starts, the desirable device 24 drives the processor 22 to read the specification parameters SP. The processor 22 generates a setting signal S according to the specification parameters SP and transmits the setting signal S to the desirable device 24. The desirable device 24 operates according to the setting signal S. The first wireless transmission module 20 and the second wireless transmission module 26 of the present invention may be radio frequency identification (RFID) modules, but the present invention is not limited thereto. For example, the first wireless transmission module 20 may be a near-field communication (NFC) reader and the second wireless transmission module 26 may be a near-field communication (NFC) tag. The communication distance of the NFC technology is about 10 cm. Alternatively, the first wireless transmission module 20 may be an ultra high frequency (UHF) reader and the second wireless transmission module 26 may be an ultra high frequency (UHF) tag. The UHF technology features longer communication distance and high penetration. The UHF technology is used for setting a plurality of desirable devices to be set. Both of the NFC reader and the UHF reader have memories to store the specification parameters SP. When the desirable device 24 is shut down, the present invention updates the specification parameters of the desirable device 24 in a wireless communication way to avoid connecting with the desirable device through a physical cable when the desirable device is shut down, thereby omitting the step of connecting the physical cable and greatly reducing the cost and time of modifying parameters. Since the desirable device 24 need not start, the modifying process can be simplified to improve the competitiveness of the desirable device 24. Besides, the real-time state of the desirable device 24 is obtained when the desirable device operates.

The parameter-setting device 18 further comprises a smart device 28 and a computer host 30. For example, the smart device 28 may be a smart phone. The smart device 28 is electrically connected to the second wireless transmission module 26 and has a built-in application program corresponding to the second wireless transmission module 26 and the first wireless transmission module 20. The computer host 30 is electrically connected to the smart device 28, the computer host 30 establishes the specification parameters SP and transmits the specification parameters SP to the smart device 28 to store the specification parameters SP into the smart device 28 when the desirable device 24 is shut down, and the smart device 28 uses the application program to transmit the specification parameters SP to the first wireless transmission module 20 through the second wireless transmission module 26 to store the specification parameters SP into the first wireless transmission module 20. The desirable device 24 of the present invention may be a power supply, a charger, an inverter, or a variable frequency drive (VFD). The specification parameters SP comprise an output current, an output voltage, and industrial information. For example, when the desirable device 24 is a charger, the specification parameters SP comprise a charging voltage, a charging current, charging time, and industrial information. When the desirable device 24 is a power supply, the specification parameters SP comprise an output current, an output voltage, function setting, protection setting, and industrial information. When the desirable device 24 is an inverter, the specification parameters SP comprise an output voltage, an output frequency, and control parameters. When the desirable device 24 is a VFD, the specification parameters SP comprise rotational speed, a control curve, compensation parameters, and protection setting. In addition, the processor 22 obtains the output parameters of the desirable device 24 such as output signals, an output voltage, or an output current, transmits the output parameters to the smart device 28 and the computer host 30 through the first wireless transmission module 20 and the second wireless transmission module 26, and uses the smart device 28 and a display connected with the computer host 30 to display the output parameters.

The operation of the first embodiment of the wireless device for setting parameters is introduced as follows. Firstly, the desirable device 24 is shut down. When the desirable device 24 is shut down, the computer host 30 establishes the specification parameters SP and transmits the specification parameters SP to the smart device 28 to store the specification parameters SP into the smart device 28. The smart device 28 uses the application program to transmit the specification parameters SP to the first wireless transmission module 20 through the second wireless transmission module 26, so as to store the specification parameters SP into the first wireless transmission module 20. When the desirable device 24 starts, the desirable device 24 drives the processor 22 to read the specification parameters SP. The processor 22 generates the setting signal S according to the specification parameters SP and transmits the setting signal S to the desirable device 24. The desirable device 24 operates according to the setting signal S.

When the desirable device 24 starts, the processor 22 obtains the output parameters of the desirable device 24 and stores the output parameters into the first wireless transmission module 20. When the smart device 28 uses the application program to transmits a monitoring request to the first wireless transmission module 20 through the second wireless transmission module 26, the first wireless transmission module 20 transmits the output parameters back to the smart device 28 and the computer host 30 through the second wireless transmission module 26 according to the monitoring request, and uses the smart device 28 and the display connected with the computer host 30 to display the output parameters.

Figure 4:
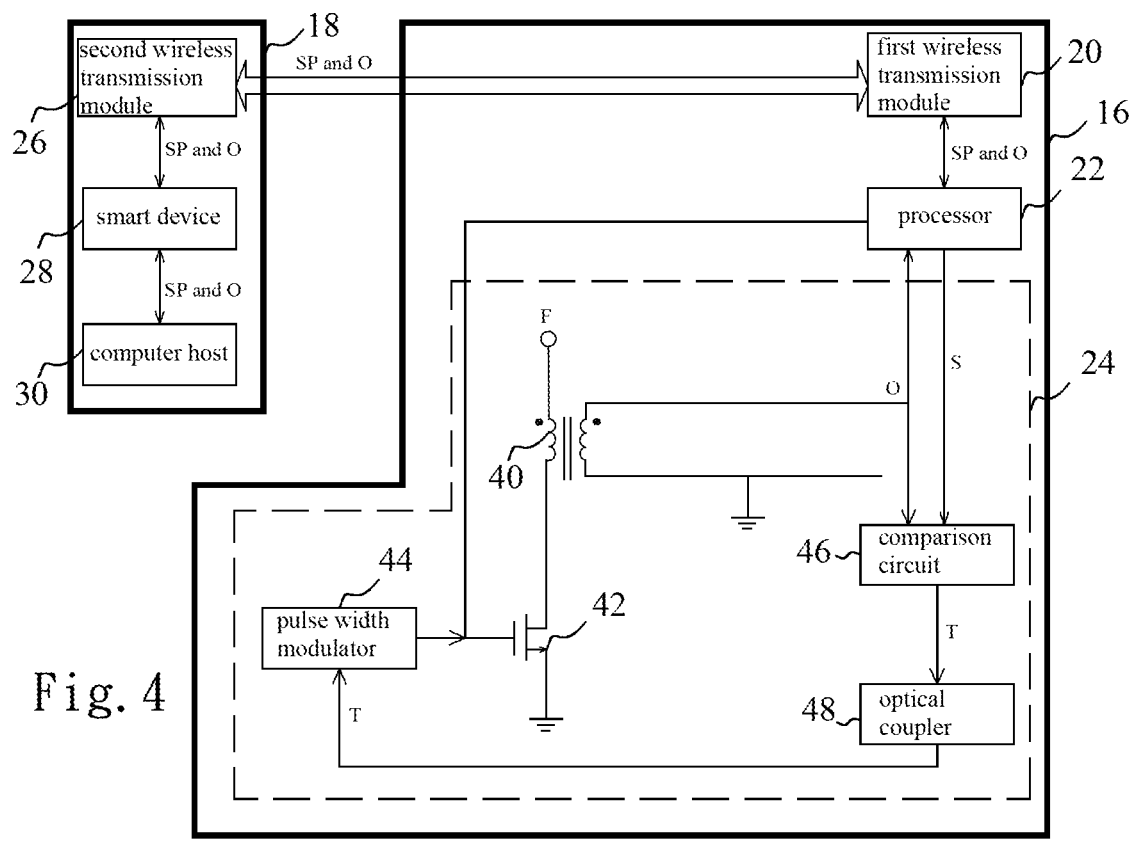
FIG. 4 is a diagram schematically showing a wireless device for setting parameters according to the second embodiment of the present invention.

Refer to FIG. 4. The second embodiment of the wireless device for setting parameters is introduced as follows. The second embodiment is different from the first embodiment in the desirable device 24. In the second embodiment, the desirable device 24 is a power supply. The power supply further comprises a transformer 40, an electronic control switch 42, a pulse width modulator 44, a comparison circuit 46, and an optical coupler 48. The transformer 40 has a primary side and a secondary side, and the primary side receives a fixed voltage F. The electronic control switch 42 is electrically connected to the primary side and grounded. The pulse width modulator 44 is electrically connected to the electronic control switch 42 and the processor 22, controls the switching state of the electronic control switch 42, and uses the fixed voltage F to store energy into the primary side, and the secondary side converts the energy into an output signal O, wherein the output signal O may be an output current or an output voltage. The pulse width modulator 44 drives the processor 22 to read the specification parameters SP. The comparison circuit 46 is electrically connected to the secondary side and the processor 22, receives the output signal O and the setting signal S, and compares the output signal O with the setting signal S to generate a comparison result T. If the output signal O is an output current, the comparison circuit 46 uses a resistor to convert the output current into a corresponding voltage and compares the corresponding voltage with setting signal S to generate the comparison result T. The optical coupler 48 is electrically connected to the comparison circuit 46 and the pulse width modulator 44, and the pulse width modulator 44 receives the comparison result T through the optical coupler 48 and changes the output signal O according to the comparison result T. The processor 22 is electrically connected to the secondary side of the transformer 40 to receive the output signal O and transmits the output signal O to the parameter-setting device 18 through the first wireless transmission module 20 and the second wireless transmission module 26.

The operation of the second embodiment of the wireless device for setting parameters is introduced as follows. Firstly, the desirable device 24 is shut down. When the desirable device 24 is shut down, the computer host 30 establishes the specification parameters SP and transmits the specification parameters SP to the smart device 28 to store the specification parameters SP into the smart device 28. The smart device 28 uses the application program to transmit the specification parameters SP to the first wireless transmission module 20 through the second wireless transmission module 26, so as to store the specification parameters SP into the first wireless transmission module 20. When the desirable device 24 starts, the pulse width modulator 44 controls the switching state of the electronic control switch 42, and uses the fixed voltage F to store energy into the primary side, and the secondary side converts the energy into an output signal O. Simultaneously, the pulse width modulator 44 drives the processor 22 to read the specification parameters SP. The processor 22 generates the setting signal S according to the specification parameters SP. The comparison circuit 46 receives the output signal O and the setting signal S and compares the output signal O with the setting signal S to generate the comparison result T. The pulse width modulator 44 receives the comparison result T through the optical coupler 48 and changes the output signal O according to the comparison result T.

When the desirable device 24 starts, the processor 22 obtains the output parameters of the desirable device 24 and stores the output parameters into the first wireless transmission module 20. When the smart device 28 uses the application program to transmits a monitoring request to the first wireless transmission module 20 through the second wireless transmission module 26, the first wireless transmission module 20 transmits the output parameters back to the smart device 28 and the computer host 30 through the second wireless transmission module 26 according to the monitoring request, and uses the smart device 28 and the display connected with the computer host 30 to display the output parameters.

Figure 5:
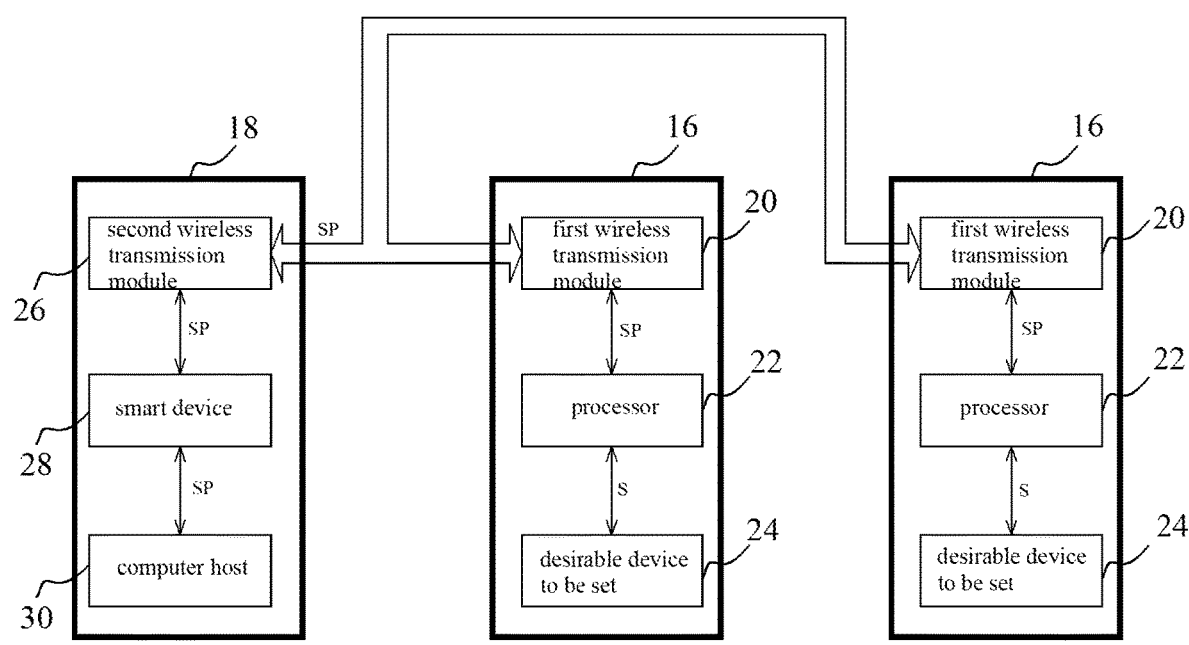
FIG. 5 is a diagram schematically showing a wireless device for setting parameters according to the third embodiment of the present invention.

Refer to FIG. 5. The third embodiment of the wireless device for setting parameters is introduced as follows. The third embodiment is different from the first embodiment in the number of the electronic device 16. In the third embodiment, there is a plurality of electronic devices 16. Thus, the parameter-setting device 18 can simultaneously update the specification parameters SP of the plurality of electronic devices 16.

In conclusion, the present invention updates the specification parameters of the desirable device to be set of the electronic device in a wireless communication way to avoid connecting with the desirable device through a physical cable when the desirable device is shut down, thereby omitting the step of connecting the physical cable and greatly reducing the cost and time of modifying parameters. Since the desirable device need not start, the modifying process can be simplified to improve the competitiveness of the desirable device. Besides the real-time state of the desirable device is obtained when the desirable device operates.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A wireless system for setting parameters comprising:
at least one electronic device having a first wireless transmission module, a processor, and a desirable device to be set, the processor being electrically connected to the first wireless transmission module and the desirable device to be set; and
a parameter-setting device having a second wireless transmission module, the second wireless transmission module and the first wireless transmission module being wirelessly connected to the processor and the desirable device,
wherein the parameter-setting device establishes specification parameters and transmits the specification parameters to the first wireless transmission module through the second wireless transmission module to store the specification parameters into the first wireless transmission module when the desirable device is shut down, the desirable device drives the processor to read the specification parameters when the desirable device starts, the processor generates a setting signal according to the specification parameters and transmits the setting signal to the desirable device, the desirable device operates according to the setting signal, and the desirable device is a power supply which comprises:
a transformer having a primary side and a secondary side, wherein the primary side receives a fixed voltage;
an electronic control switch electrically connected to the primary side and grounded;
a pulse width modulator electrically connected to the electronic control switch and the processor, controlling a switching state of the electronic control switch and using the fixed voltage to store energy into the primary side, wherein the secondary side converts the energy into an output signal, and the pulse width modulator drives the processor to read the specification parameters;
a comparison circuit electrically connected to the secondary side and the processor, receiving the output signal and the setting signal and comparing the output signal with the setting signal to generate a comparison result; and
an optical coupler electrically connected to the comparison circuit and the pulse width modulator, wherein the pulse width modulator receives the comparison result through the optical coupler and changes the output signal according to the comparison result.

2. The wireless system for setting parameters according to claim 1, wherein the parameter-setting device further has:
a smart device electrically connected to the second wireless transmission module, having a built-in application program that corresponds to the second wireless transmission module and the first wireless transmission module; and
a computer host electrically connected to the smart device, establishing the specification parameters and transmitting the specification parameters to the smart device to store the specification parameters into the smart device when the desirable device is shut down, wherein the smart device uses the application program to transmit the specification parameters to the first wireless transmission module through the second wireless transmission module to store the specification parameters into the first wireless transmission module.

3. The wireless system for setting parameters according to claim 2, wherein the smart device is a smart phone.

4. The wireless system for setting parameters according to claim 1, wherein the processor is electrically connected to the secondary side to receive the output signal and transmits the output signal to the parameter-setting device through the first wireless transmission module and the second wireless transmission module.

5. The wireless system for setting parameters according to claim 1, wherein the specification parameters comprise an output current, an output voltage, and industrial information.

6. The wireless system for setting parameters according to claim 1, wherein the first wireless transmission module and the second wireless transmission module are radio frequency identification (RFID) modules.

7. The wireless system for setting parameters according to claim 1, wherein the first wireless transmission module is a near-field communication (NFC) reader and the second wireless transmission module is a near-field communication (NFC) tag.

8. The wireless system for setting parameters according to claim 1, wherein the first wireless transmission module is an ultra high frequency (UHF) reader and the second wireless transmission module is an ultra high frequency (UHF) tag.

9. The wireless system for setting parameters according to claim 1, wherein the at least one electronic device further comprises a plurality of electronic devices.

* * * * *